United States Patent [19]

Berger

[11] 3,708,729

[45] Jan. 2, 1973

[54] SOLID ELECTROLYTE FILMS AND DEVICES CONTAINING SAME

[75] Inventor: Carl Berger, Santa Ana, Calif.

[73] Assignee: Unican Security Systems, Ltd., Montreal, Quebec, Canada

[22] Filed: Dec. 10, 1971

[21] Appl. No.: 206,891

Related U.S. Application Data

[63] Continuation-in-part of Ser. No. 823,478, May 9, 1969, abandoned.

[52] U.S. Cl. ................317/230, 252/62.2, 317/231
[51] Int. Cl. ..............................................H01g 9/02
[58] Field of Search..............317/230, 231, 232, 233; 252/62.2

[56] References Cited

UNITED STATES PATENTS

| | | | |
|---|---|---|---|
| 2,786,088 | 3/1957 | Robinson | 136/83 |
| 3,214,648 | 10/1965 | Ross et al. | 317/230 |
| 3,214,650 | 10/1965 | Ross et al. | 317/230 |
| 3,443,997 | 5/1969 | Argue et al. | 136/83 |

*Primary Examiner*—James D. Kallam
*Attorney*—Max Geldin

[57] ABSTRACT

Solid electrolyte films comprising a major portion of a solid electrolyte such as $Ag_3SI$ and a minor portion of a film forming constituent such as polyphenylene oxide, which are employed in electrolytic devices such as battery cells or colulometric devices such as counters or timers. The flexible films of this invention represent a substantial advance in applicability, size and cost compared to presently available solid electrolytes.

14 Claims, No Drawings

SOLID ELECTROLYTE FILMS AND DEVICES CONTAINING SAME

This application is a continuation-in-part of my copending application Ser. No. 823,478, filed May 9, 1969, now abandoned.

The electrolyte in electrolytic devices is a vital component but at the same time is the cause of degradation of cell components and life expectancy of the cell. Aqueous solutions or separators with aqueous electrolyte solutions in them are most conventionally employed in batteries such as lead-acid, nickel-cadmium, mercury-zinc and in silver coulometers. Leakage in sealed or unsealed cells is a problem. Evaporation provides maintenance difficulties. Aqueous solutions corrode the electrodes thereby lowering capacity and shortening wet stand life. A potential solution to many of the preceding difficulties has been sought for many years. In recent years developments have occurred in producing superior electrolytes in the form of electrolytically conductive solids. The main efforts heretofore have centered about the structural modifications of AgI and have borne fruit in the synthesis of $Ag_3SI$ and $RbAg_4I_5$ as well as other highly conductive double salts such as $Ag_2S$-$Ag_2HgI_4$. B. Reuter and K. Hardel, Naturwissenschaften 48, 161 (1961); T. Takahashi and O. Yammamoto, Electrochem, Acta 11, 779 (1966); and T. N. Bradley and P. D. Greene, Trans. Faraday Soc. 62, 2069 (1966). In these solid electrolytes the major form of electrolytic transport is by the silver ion which is considered as migrating through the atomic lattice. The silver is derived from a silver anode which converts Ag to Ag+, which migrates through the lattice and reacts at the cathode with reduced iodine or iodine complex contained in such cathode, or with other cathodes such as bromine-carbon.

These materials have high electrolytic conductance in the range of about 0.001 ohm$^{-1}$ cm$^{-1}$ to about 0.5 ohm$^{-1}$ cm$^{-1}$. These materials are usually produced in powdered form and compacted under pressure to form hard rigid wafers. An exception to this is described in my copending application Ser. No. 188,416, filed Oct. 12, 1971, which is a continuation-in-part of application Ser. No. 823,313, filed May 9, 1969, now abandoned, describing thin film flexible or curved battery cells or electrochemical timers.

The solid electrolyte materials have many advantages as compared to conventional systems. Among these are elimination of water from the electrolyte system, long term operational stability, long shelf life, no gassing and complete hermetic sealing.

However, there are disadvantages which accrue as a result of the inorganic nature of the above-described solid electrolytes. The wafers or compacts thereof are generally hard and rigid and therefore susceptible to shock more so than a flexible system. Because of this rigidity and brittleness, serious limitations as to the size of such a solid electrolyte and its ability to be machined exist. Moreover, solid rigid bodies are limited with respect to thinness, far more than a flexible film would be. Therefore such solid electrolytic devices must be heavier and larger than optimization often require. Finally, solid rigid materials are seriously restricted with respect to configurational freedom.

Thus, for example, Argue et al. U.S. Pat. No. 3,519,404 discloses solid ionic conductors containing a solid electrolyte material. The patentee indicates that inorganic materials such as calcium sulfate, and silica, and organic polymers such as methyl methacrylate polymer, can be employed as diluents to function as desiccants, as stabilizers, or for preshaping the conductive composition, but there is no suggestion in the patent that any materials including the methyl methacrylate polymer of the patent have properties to permit them to function as a film former to produce a flexible or non-rigid highly conductive thin solid electrolyte film.

According to the present invention there is provided a composition which alleviates and circumvents many of the difficulties described above with respect to applicability of solid electrolytes, in the form of an electrolytically conductive flexible solid electrolyte film, consisting essentially of a major proportion of a solid electrolyte, preferably a silver-containing complex metal solid electrolyte, and a minor portion of a film forming constituent. According to a feature of the invention, the film forming constituent is employed in certain proportions in combination with solid electrolyte, so as to render the resulting film flexible while at the same time permitting high conductivity of the film.

Thus, for example, a solid electrolyte such as $Ag_3SI$ is ground, e.g., to 325 Tyler mesh or finer mesh, and combined with a preferably small amount of a mixture of a film former such as polyvinylidene chloride suspended or dissolved in a solvent such as cyclohexanone. To impart appropriate film properties, plasticizers such as beeswax may also be added. The film is then solvent cast. It is found surprisingly that in the presence of a film former, particularly in the proportions noted below, the film is highly electrolytically conductive, as well as being flexible, transporting Ag+ ion through the film. This is previously unknown for such a composite material containing a silver complex salt, e.g., of the types noted above, and a film former.

The solid electrolytes employed herein are highly conductive in the solid form and preferably are inorganic silver-containing complex metal solid electrolytes, preferred examples being $Ag_3SI$, $RbAg_4I_5$ and $RbCN \cdot 4AgI$. Other suitable solid electrolyte materials which can be employed include $4AgI \cdot Ag_3PO_4$, $(CH_3)_4NI \cdot 8HgI$, $Ag_2Se$-$HgI_2$, $Ag_2Te$-$AgIHgI_2$, $Ag_2S$-$Ag_2HgI_4$ and $Cu_2S$-$Ag_2S$. It will be understood also that mixtures of the solid electrolyte materials, e.g., those noted above also can be employed, such as a mixture of $Ag_3SI$ and $RbAg_4I_5$. The above solid electrolytes are highly conductive, ranging in specific conductivities from about 1 ohm$^{-1}$ cm$^{-1}$ to about 0.001 ohm$^{-1}$ cm$^{-1}$.

Various film formers can be employed generally in producing the flexible composite electrolyte film of the invention. Examples of preferred film formers which can be employed according to the invention include polyphenylene oxide, polysulfone and polyvinylidene chloride. Polyphenylene oxide is a commercially available material, a representative type thereof having a molecular weight range from about 25,000 to about 30,000, marketed by General Electric, and also polysulfone is a commercially available material, i.e., marketed by Union Carbide, a representative material of this type having a molecular weight range from about 22,000 to about 35,000. However, it will be understood that the molecular weights of the polyphenylene oxide and polysulfone can vary substantially, and can be outside the above-noted molecular weight ranges.

An important characteristic of the film former is that it should not completely "wet" and penetrate the solid electrolyte powder. Otherwise the electrolytic conductivity of the resultant film can be very low and practically unsuitable. It has been found that in order to obtain a composite electrolyte film according to the invention having the above-noted characteristics, that is, which is highly conductive yet which is flexible, the film former is employed in an amount ranging from about 0.5 percent to about 10 percent, preferably about 1 percent to about 10 percent, by weight of the mixture of solid electrolyte material and film former, the remaining major portion of about 90 percent to about 99.5 percent, preferably about 90 percent to about 99 percent, by weight, being the solid electrolyte material. If more than about 10 percent of the film former by weight of the mixture is employed, the composite film becomes undesirably highly resistive, with correspondingly reduced conductivity, and if less than 0.5 percent of the film former by weight of the mixture is employed, the flexibility of the composite film is undesirably materially reduced, rendering the composite relatively rigid.

A portion of the film former or non-electrolyte material can include plasticizers in order to further modify or impart appropriate film characteristics. Examples of such plasticizers are the commercially available Emery Plastolein 970, understood to be polypropylene polyazelate having molecular weight ranging from about 850 to about 6,000, and beeswax. Such plasticizers can be employed in an amount generally ranging from 2 percent to about 25 percent by weight of the combination of film former and plasticizer.

Various solvents can be employed to produce the casting mixture. Typical of these are cyclohexanone and chloroform. Other solvents can be employed depending on the film former and the rate of solvent evaporation desired.

The thickness of the solid electrolyte films produced according to the invention can vary but can range from about 0.0001 inch to about 0.025 inch, preferably from about 0.001 inch to about 0.010 inch.

The ultimate electrolytic conductance of the flexible composite films of the invention is determined by the quantity and type of the film former, including plasticizer, and the quantity and type of the solid electrolyte. Experience has indicated that suitable specific conductivities of the essentially inorganic flexible films containing the above-noted minor portions of film formers can be achieved. Characteristically specific electrolytic conductivities generally range from about $0.2 \times 10^{-2}$ $ohm^{-1}cm^{-1}$ to about $0.9 \times 10^{-2}$ $ohm^{-1}cm^{-1}$ for $Ag_3SI$ containing films, and from about $0.2 \times 10^{-1}$ $ohm^{-1}cm^{-1}$ to about $1.0 \times 10^{-1} ohm^{-1}cm^{-1}$ for $RbAg_4I_5$ containing films.

It will be noted that the Ag+ ion transport through the composite flexible film indicates that the mechanism of ion transport through the film electrolyte is substantially the same as that of the completely inorganic wafers described above. A typical galvanic cell in which the composite flexible film electrolyte of the invention can be employed is one comprising a silver anode, a solid electrolyte composite flexible film and an iodine-carbon cathode.

Electrodes which can be employed in conjunction with the flexible composite solid electrolyte films hereof are, for example, silver and iodine-carbon. Other electrode systems which can be employed include silver alloys, such as silver-gold, $RbI_3$, $Br_2$-carbon, Se, Te and tetramethyl ammonium iodide. Metal electrodes are conveniently employed in thin flexible strips, e.g., silver strips, on which the flexible solid electrolyte film of the invention can be applied, and cathodes can be employed in the form of halogens such as iodine and bromine, in intimate mixtures with carbon or, depending on the degree of flexibility required, with admixed binders such as polyphenylene oxide and plasticizers, e.g., polypropylene polyazelate, and applied to a surface of the flexible composite solid electrolyte film.

The flexible composite solid electrolyte film, as well as an electrochemical device, e.g., galvanic cell or battery in which such film is incorporated, has a degree of flexibility such that it is non-rigid and non-brittle and has sufficient resilience so that, for example, such film can be readily machined. Hence the term "flexible" as employed herein is intended to denote solid electrolyte films possessing the above characteristics.

Examples of practice of the invention are as follows:

EXAMPLE 1

Flexible composite solid electrolyte films according to the invention were prepared, containing as solid electrolyte $RbAg_4I_5$ and polysulfone as film former, in varying proportions, and the conductivities of the respective films measured. The data and results of these tests are noted on the table below.

$RbAg_4I_5$ — polysulfone films

| polysulfone film former (% by weight) | conductivity of film ($ohm^{-1}cm^{-1}$) approximate |
|---|---|
| 0.8 | 0.074 |
| 1.33 | 0.070 |
| 1.5 | 0.082 |
| 2.6 | 0.064 |
| 3.4 | 0.043 |
| 6.5 | 0.025 |
| 10 | 0.002 |
| 11 | 0.0002 |

It will be seen from the results of the above table that conductivities of the film are high when employing up to about 10 percent of film former, but when employing amounts of film former in excess of about 10 percent, e.g., about 11 percent, film conductivity substantially increases of the order of one magnitude.

Relatively similar conductivity results are obtained employing $Ag_3SI$ as solid electrolyte.

EXAMPLE 2

18.95 g. of AgI and 20.0 g of $Ag_2S$ were thoroughly mixed in powder form and placed inside a mullite tube in a ceramic dish. In another ceramic dish was placed some sulfur to maintain a sulfur atmosphere. The mullite tube was sealed and heated at 500°C for 17 hours. The fused $Ag_3SI$ was removed and ground up with a mortar and pestel until all of the material passed through a Tyler 325 mesh sieve. 4 grams of $Ag_3SI$ were then mixed with 0.4 gram of polyphenylene oxide in the form of a 20 percent solution of the film former in chloroform or a total of 2 grams of solution. The mixture was cast on a piece of glass between taped film height regulators and smoothed with a thin steel bar. After evaporation of the solvent a dark lustrous film 0.003 inch in thickness was removed from the glass plate. A piece of the film 1 cm² in area was placed on a thin strip of silver. On the other side of the film was placed a powdered 90 percent iodine — 10 percent carbon mixture and a strip of silver placed on top of the iodine-carbon mixture and the entire assembly clamped. A short circuit reading of 0.2–0.1 ma (milliamps) was obtained for one hour from the battery cell.

EXAMPLE 3

The procedure of Example 2 when repeated employing 0.20 gram of polyphenylene oxide, produces a short circuit reading of 0.3–0.4 ma.

EXAMPLE 4

Procedure similar to Example 2 was performed except that the $Ag_3SI$ content of the film was increased to 99 percent by weight, with 1 percent by weight of film former. Short circuit currents of 0.5–0.6 ma were achieved.

EXAMPLE 5

Procedure similar to Example 2 was performed except that 5 percent of the polyphenylene oxide film former was replaced with Plastolein 970 Polymeric. The resultant film performed about the same as the battery cell of Example 2 but the solid electrolyte film was more flexible and easier to bend without cracking.

EXAMPLE 6

80 mole % AgI and 20 mole % RbI were mixed in powder form and heated in a sealed chamber under inert atmosphere to 300°C for 1 hour and allowed to cool. The solidified $RbAg_4I_5$ which weighed 24.52 grams was ground up fine until all of the powder passed through a 400 mesh screen. 4.5 grams of $RbAg_4I_5$ was triturated in 5 grams of a 10 percent polyvinylidene chloride solution in cyclohexanone and the resulting mixture cast into a 0.005 inch thick film as described in Example 2. A battery cell similar to that of Example 2 was constructed and the 0.005 inch thick straw colored film produced above utilized therein. A short circuit current of 0.3 ma was observed for about 2 hours.

EXAMPLE 7

7.0 grams of $Ag_3SI$ and 3 grams of $RbAg_4I_5$, both powders finer than 325 mesh, were blended into 10 grams of a 10 percent polyvinylidene chloride solution in cyclohexanone and a film was produced in a manner similar to Example 6. The resulting 0.003 inch thick film was measured for electrical conductance and had a value of $2 \times 10^{-3} ohm^{-1}cm^{-1}$.

EXAMPLE 8

The procedure of Example 6 was repeated except that 2.5 percent of the polyvinylidene chloride film former was replaced with beeswax. The resultant film was more flexible than that in Example 6 and electrical conductance was approximately equivalent to $2.3 \times 10^{-3} ohm^{-1} cm^{-1}$.

EXAMPLE 9

The film forming procedure of Example 8 was repeated except that $RbCN \cdot 4AgI$ replaced $RbAg_4I_5$. The resultant film had an electrical conductivity of $1.5 \times 10^{-3} ohm^{-1}cm^{-1}$.

EXAMPLE 10

The film of Example 2 was employed in an electrochemical timer application. The film is placed between two silver strips and a clamp applied to the assembly. A D.C. potential of 2.3 volts is imposed on the system and 0.1 ma/cm² passed until all of the anodic silver is used up. At this point a sharp rise in applied potential occurred. This signal indicates silver depletion and is applied in a digital counter device to measure spurious D.C. current in radar devices.

Having described particular embodiments of the invention for purposes of illustration, it will be understood that the invention is not to be taken as limited except by the scope of the appended claims.

I claim:

1. An electrolytically conductive flexible solid film of electrolytic material consisting essentially of a mixture of a major portion of an inorganic solid electrolyte and about 0.5 percent to about 10 percent of a film forming constituent, by weight of the mixture of said solid electrolyte and said constituent, said film forming constituent incompletely wetting and incompletely penetrating said solid electrolyte, and said electrolyte being a complex inorganic silver-containing solid electrolyte.

2. An electrolytically conductive flexible solid film as defined in claim 1, said electrolyte selected from the group consisting of $Ag_3SI$, $RbAg_4I_5$, $RbCN \cdot 4AgI$, $4AgI \cdot Ag_3PO_4$, $(CH_3)_4NI \cdot 8AgI$, $Ag_2Te\text{-}AgIHgI_2$, $Ag_2HgI_4$, $Ag_2Se\text{-}HgI_2$ and $Cu_2S\text{-}Ag_2S$.

3. An electrolytically conductive flexible solid film as defined in claim 1, said electrolyte being selected from the group consisting of $Ag_3SI$, $RbCN \cdot 4AgI$ and $RbAg_4I_5$.

4. An electrolytically conductive flexible solid film as defined in claim 3, said solid electrolyte being a mixture of $Ag_3SI$ and $RbAg_4I_5$.

5. An electrolytically conductive flexible solid film as defined in claim 1, consisting essentially of about 90 percent to about 99 percent of said solid electrolyte and about 1 percent to about 10 percent by weight, of said film forming constituent.

6. An electrolytically conductive flexible solid film as defined in claim 1, wherein said film forming constituent is selected from the group consisting of polyphenylene oxide, polysulfone and polyvinylidene chloride.

7. An electrolytically conductive flexible solid film as defined in claim 2, wherein said film forming constituent is selected from the group consisting of polyphenylene oxide, polysulfone and polyvinylidene chloride.

8. An electrolytically conductive flexible solid film as defined in claim 2, wherein said film forming constituent is polyvinylidene chloride.

9. An electrolytically conductive flexible solid film as defined in claim 1, wherein said electrolyte is $Ag_3SI$ and the electrolyte conductivity of said film is in the range of about $0.2 \times 10^{-2} ohm^{-1} cm^{-1}$ to about $0.9 \times 10^{-2} ohm^{-1} cm^{-1}$.

10. An electrolytically conductive flexible solid film as defined in claim 1, wherein said electrolyte is $RbAg_4I_5$ and the electrolytic conductivity of said solid film is in the range of about $0.2 \times 10^{-1} ohm^{-1} cm^{-1}$ to about $1.0 \times 10^{-1} ohm^{-1} cm^{-1}$.

11. An electrolytically conductive flexible solid film as defined in claim 3, wherein said film forming constituent is selected from the group consisting of polyphenylene oxide, polysulfone and polyvinylidene chloride, said film having a thickness ranging from about 0.0001 inch to about 0.025 inch.

12. An electrolytically conductive flexible solid film as defined in claim 1, wherein said film forming constituent includes a plasticizer in an amount ranging from about 2 to about 25 percent of the combination of said film forming constituent and said plasticizer.

13. An electrolytically conductive flexible solid film as defined in claim 12, said plasticizer being selected from the group consisting of polypropylene polyazelate having a molecular weight range from about 850 to about 6,000, and beeswax, said film having a thickness ranging from about 0.0001 inch to about 0.010 inch.

14. An electrolytically conductive flexible solid film of electrolytic material as defined in claim 1, further including at least two electrodes contacting respective surfaces of said film.

* * * * *